United States Patent [19]

Gondek

[11] 3,902,773

[45] Sept. 2, 1975

[54] ARTICLE STORAGE APPARATUS

[75] Inventor: John A. Gondek, Parkersburg, W. Va.

[73] Assignee: Sperry Rand Corporation, Blue Bell, Pa.

[22] Filed: Mar. 9, 1973

[21] Appl. No.: 339,730

[52] U.S. Cl............. 312/223; 312/266; 214/16.4 R
[51] Int. Cl.² ...................... A47B 77/08; B65G 1/06
[58] Field of Search... 214/16.4 R, 16.1 B, 16.1 BA, 214/16.1 BB, 16.1 DB, 38 D, 516, 1 BA, 8.5 G, 8.5 F; 198/19, 179, 48; 221/77–78, 81; 312/223

[56] References Cited
UNITED STATES PATENTS

| | | | |
|---|---|---|---|
| 2,677,471 | 5/1954 | Skinner............................. | 214/1 BT |
| 2,704,609 | 3/1955 | Zeckendorf et al............. | 214/16.1 B |
| 2,829,780 | 4/1958 | Boor.............................. | 214/16.1 BB |
| 2,918,656 | 12/1959 | Noldes et al.................... | 214/16.4 A |
| 2,940,068 | 6/1960 | Stiefel.......................... | 214/16.4 A X |
| 2,940,619 | 6/1960 | Schramm et al................ | 214/16.4 R |
| 3,762,582 | 10/1973 | Barnhart et al................ | 214/16.4 R |

FOREIGN PATENTS OR APPLICATIONS

| | | | |
|---|---|---|---|
| 677,821 | 1/1964 | Canada........................ | 214/16.1 DB |
| 595,435 | 12/1947 | United Kingdom.......... | 214/16.1 BB |
| 863,025 | 3/1961 | United Kingdom......... | 214/16.1 CC |
| 874,093 | 8/1961 | United Kingdom.......... | 214/8.5 G |
| 997,728 | 7/1965 | United Kingdom.......... | 16.1 B/ |

Primary Examiner—Robert J. Spar
Assistant Examiner—R. B. Johnson
Attorney, Agent, or Firm—Frank A. Seemar; Eugene T. Battjer

[57] ABSTRACT

A device for handling any one of several individual article accommodating trays stored within a mechanized filing cabinet. The trays are supported by carriers suspended in Ferris wheel fashion from continuous chains of a rotary conveyor mechanism. Standard controls coupled to a drive motor for the conveyor effect deenergization of the motor in accordance with suitable input signals corresponding to the various carrier storage positions. Thus, any selected tray may be positioned at an access opening in the cabinet whereupon a novel mechanism automatically withdraws the tray from its respective carrier in the cabinet and subsequently returns it to the carrier.

6 Claims, 8 Drawing Figures

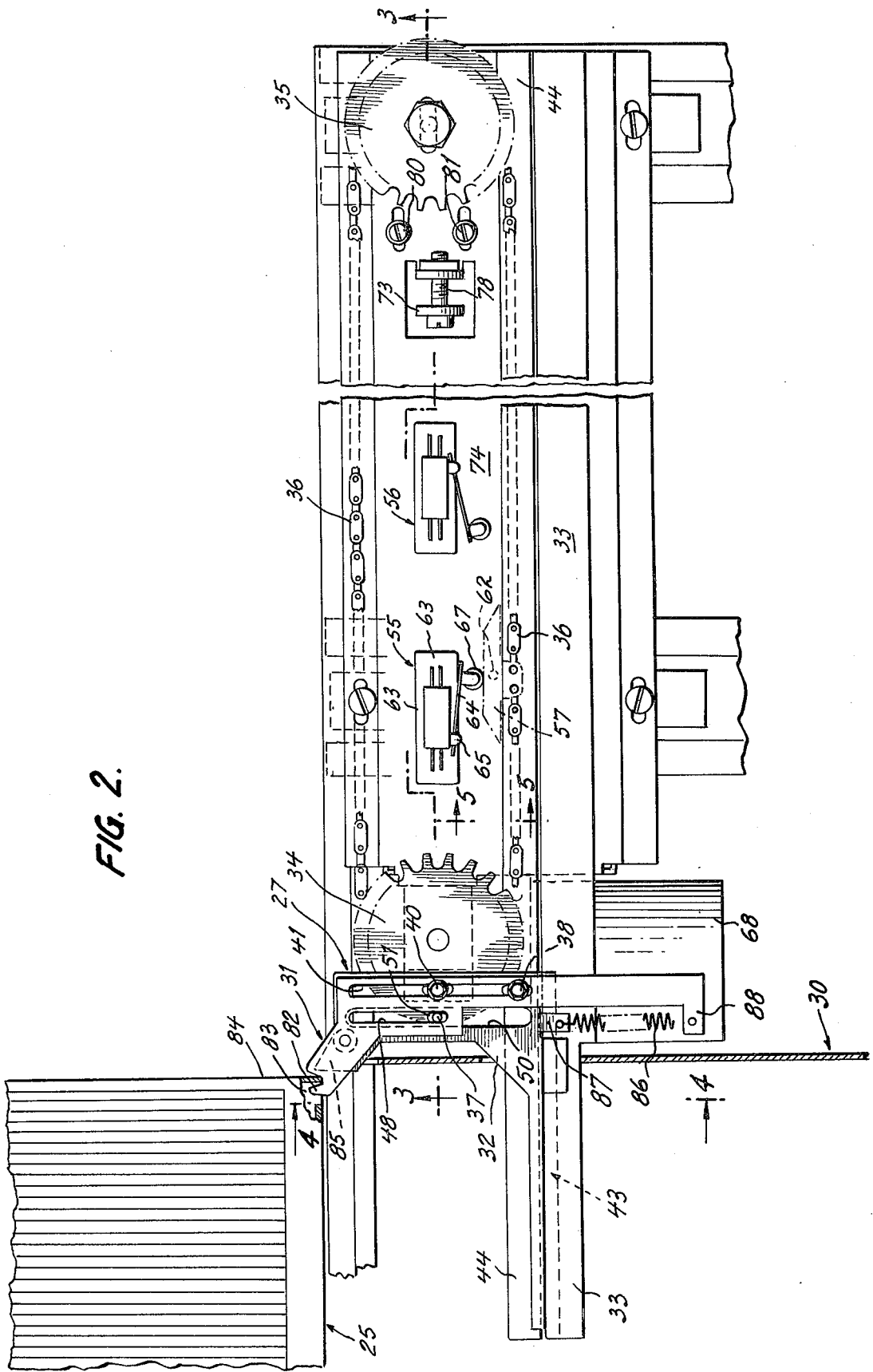

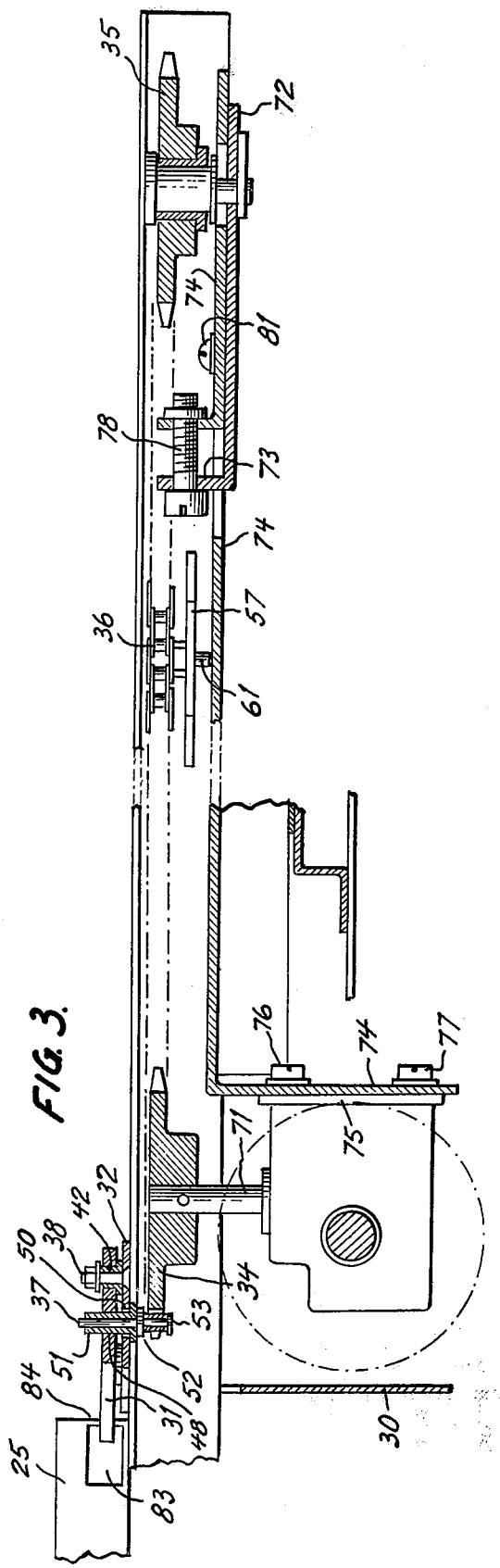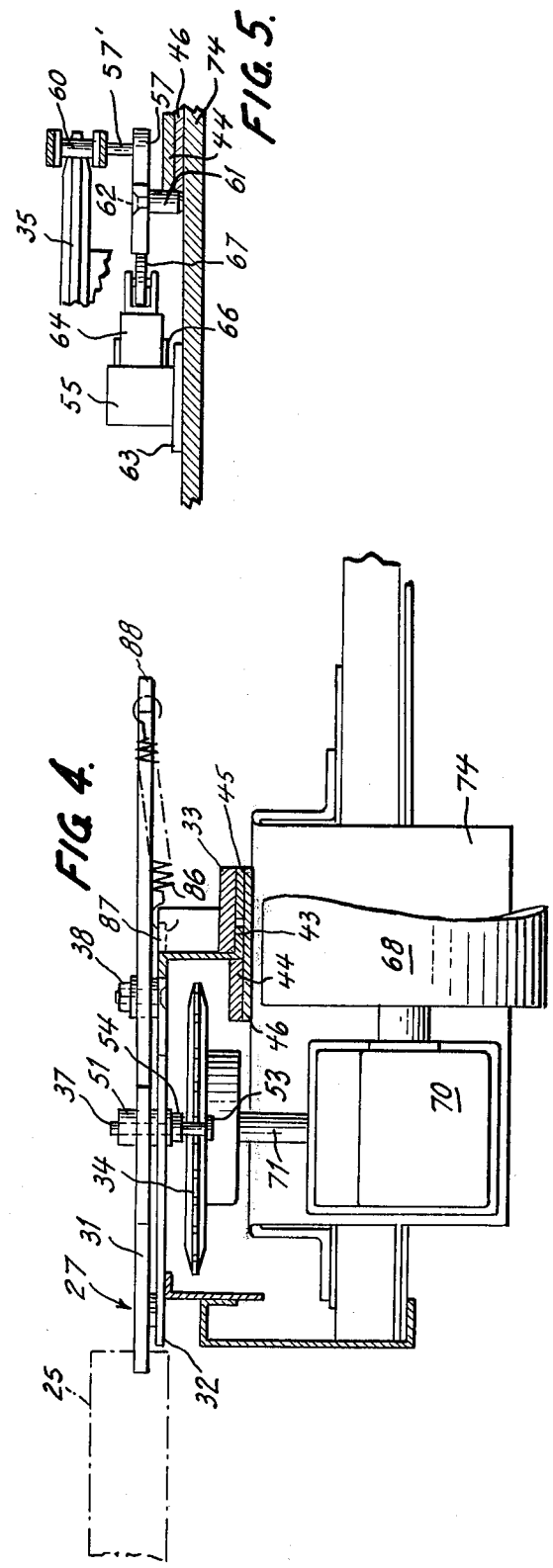

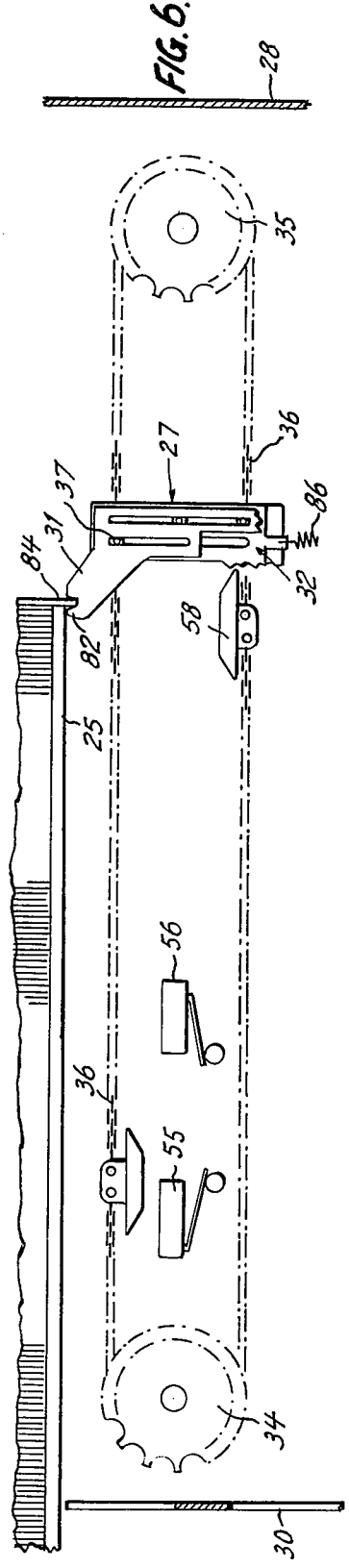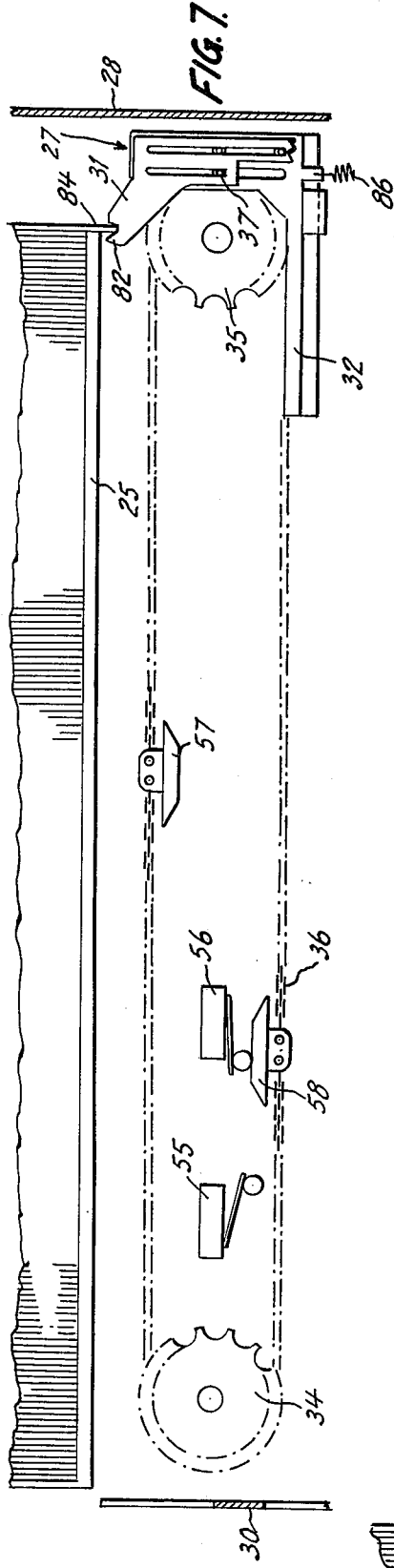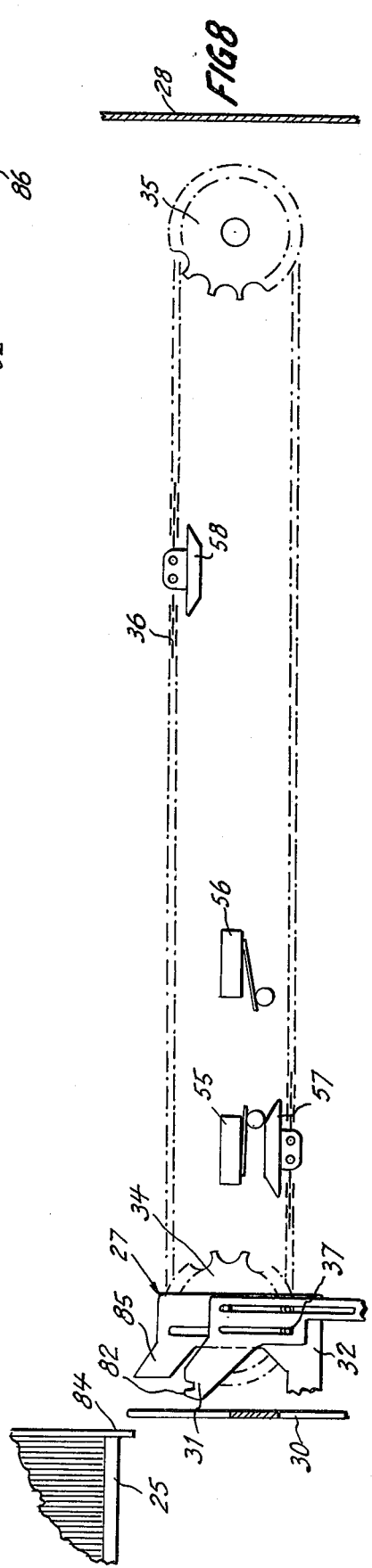

ARTICLE STORAGE APPARATUS

BACKGROUND OF THE INVENTION

The present invention relates to new and useful improvements in mechanized filing equipment, and more particularly to a mechanism for withdrawing and subsequently restoring any one of a plurality of trays stored on suspended carriers in a filing cabinet. U.S. Pat. No. 3,578,143, issued in the name of B. W. Woodward on May 11, 1971, is exemplary of prior art showing mechanized filing equipment in which the present invention may be readily embodied.

It is not uncommon in present day office facilities to use suspended-carrier type filing equipment for storing and selectively retrieving business records. For many years this general category of continuous-loop conveyor equipment has been employed in filing systems in hospitals, libraries and banks, to name a few. Moreover, automated record handling equipment by its very nature lends itself to convenient indexing and cross indexing and thus facilitates specialized inventory control applications in the warehouse and retail merchandise fields.

More specifically, one particular type of conveyor system for automatic article filing and retrieval that is known in the art comprises a plurality of carriers suspended in Ferris wheel fashion from a pair of spaced roller chains. The chains are accommodated by opposing pairs of vertically spaced sprocket wheels in a manner whereby the suspended carriers rotate in a fixed path. A work station is provided adjacent the path whereat the carriers are stopped by means of selective denergization of the drive motor in accordance with suitable input information. A control system for selectively positioning suspended article carriers is shown in U.S. Pat. No. 3,578,143, mentioned above.

An example of prior art filing equipment in which a retractor mechanism is shown in detail is U.S. Pat. No. 2,621,995, Zenner et al., Dec. 16, 1952. In the Zenner apparatus a pair of movable storage racks reciprocate vertically in side-by-side paths. Trays are selectively positioned at a work station in response to appropriate operator command signals. Each signal corresponds to a specific tray located at a predetermined position in one of the racks. A retrieved tray is removed by means of a carriage mechanism associated with the rack in which the selected tray is stored.

In equipment of the type discussed above, various means have been used to selectively extract trays from associated storage carriers. One known mechanism utilizes an electromagnet which engages the front surface of a selected tray. This arrangement requires a relatively costly electro-magnetic device. In many instances problems have been encountered during alignment of the magnet face with the tray surface and thus reducing coupling force where there is less than maximum physical contact between the surfaces. Furthermore even with proper contact, coupling force diminishes quite rapidly in proportion to distance. In fact, it has been ascertained during tests of conventional equipment that 0.002 inches of paint will reduce magnetic coupling force to one half of its original value.

Therefore, an object of the present invention is to provide a novel extractor mechanism for withdrawing a selected tray directly from its rest position in a movable carrier mounted in a storage cabinet and for restoring such withdrawn tray to the carrier. The selected carrier is engaged by a unique mechanism which obviates electromagnetic coupling means which are costly and require precise physical relationships.

Another object is the provision of a novel mechanism in which a desirable tolerance for carrier posting position is made possible without sacrificing speed, simplicity and storage capacity.

SUMMARY OF THE INVENTION

The present invention contemplates new and improved storage apparatus having a mechanism for automatically withdrawing a selected tray from a storage cabinet in which a plurality of trays are supported on movably mounted carriers conveyed along a fixed path.

In one embodiment the apparatus comprises a substantially rectangular storage cabinet having a work station including a horizontal table portion extending outwardly therefrom. A conveyor assembly, mounted within the cabinet, supports carriers on which a plurality of trays are stored. Selective energization of a drive system imparts motion to the carriers whereby a predetermined tray is positioned for access adjacent to the table. An extractor mechanism mounted on the table is adapted to withdraw the tray from its associated carrier. The extractor comprises a tray engaging arm mounted on a guided member adapted to be reciprocally driven between inner and outer positions. In the inner position the arm is directly coupled to the selected tray whereupon withdrawal of the tray is effected as the arm and guided member move in concert outwardly along the table. The extractor mechanism likewise is adapted to return the tray to its respective carrier by means of inward motion of the arm and guided member, under conditions where the engaging arm is still coupled to the previously withdrawn tray.

BRIEF DESCRIPTION OF THE DRAWINGS

FIG. 2 is detailed plan view of the extractor mechanism shown in FIG. 1.

FIG. 3 is a sectional view taken along line 3—3 in FIG. 2.

FIG. 4 is a sectional view taken along line 4—4 of FIG. 2.

FIG. 5 is a sectional view taken along line 5—5 of FIG. 2.

FIGS. 6, 7, and 8 are schematic illustrations of the extractor mechanism, showing several operative positions of the extractor arm and an associated tray.

DESCRIPTION OF THE PREFERRED EMBODIMENT

Figure 1:
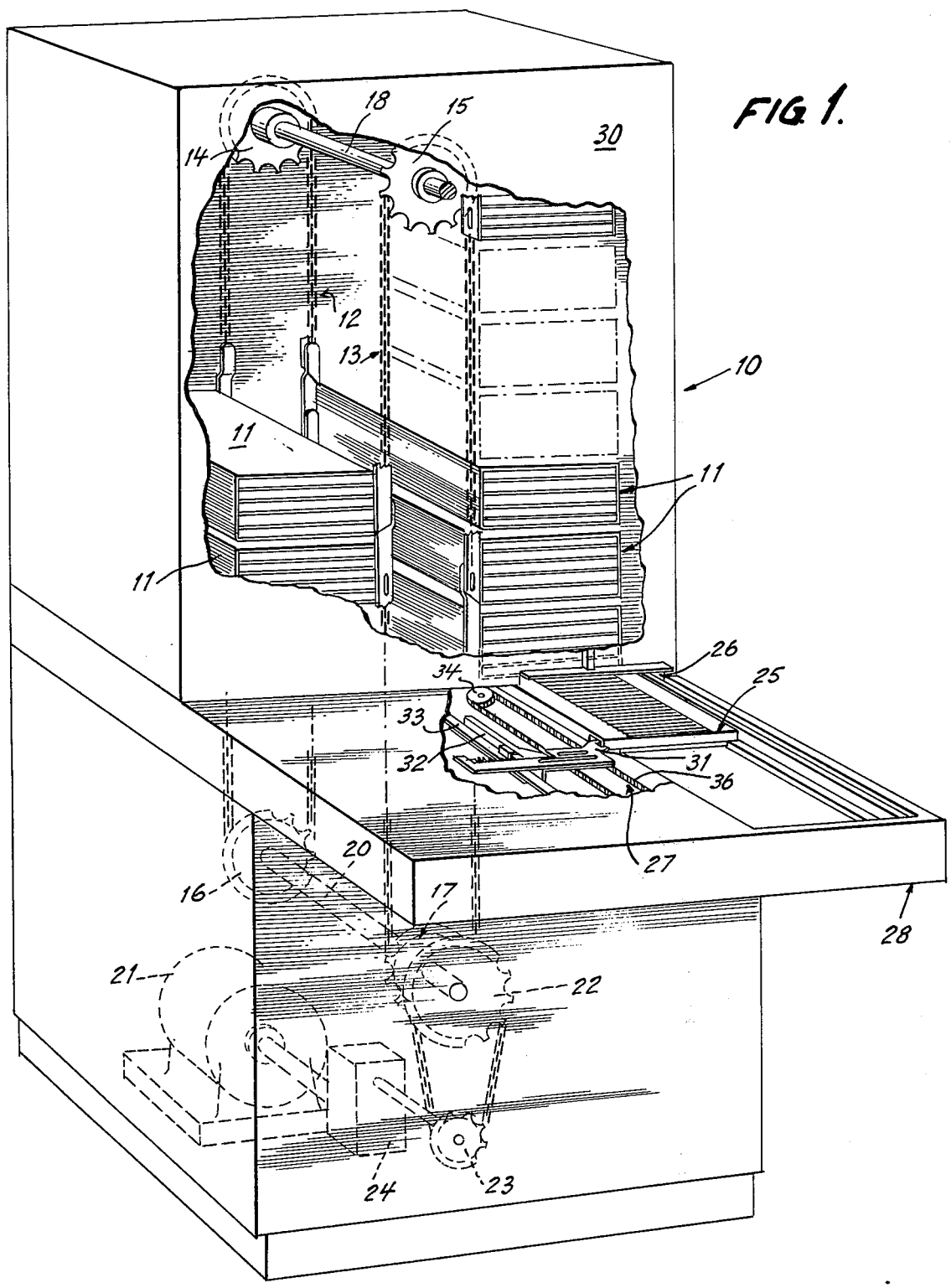
FIG. 1 is a perspective view in which cutaway and phantom portions schematically illustrate apparatus in which the present invention is embodied.

Now referring to the drawings for a more detailed description, a mechanized filing cabinet, generally designated by reference numeral 10, is shown in FIG. 1 to illustrate by way of example, one embodiment of equipment in which the present invention may be employed. Cabinet 10 comprises a generally rectangularly shaped upstanding unit, having a framework (not shown) therein for supporting a conveyor system including a plurality of article carriers 11. The carriers are suspended from a pair of spaced chains 12, 13 trained about opposing pairs of upper and lower sprocket wheels 14, 15 and 16, 17, respectively. The wheels are keyed to upper and lower shafts 18 and 20, respectively, which are mounted in the cabinet by standard mounting assemblies, not shown. A drive motor 21 is mounted in the bottom of the storage cabinet for rotatably driving shaft 20 via intermediate step down gears 22 and 23, and appropriate coupling mechanism 24. Thus, by selectively energizing motor 21 by known means (e.g. a manual keyboard entry as shown in the Woodward or Zenner patents mentioned above) chains 12, 13 move at a controlled rate to advance carriers 11 along an endless loop path which passes adjacent to a work station whereat the selected contents of a predetermined carrier are made available in the manner now to be discussed.

Each carrier 11 comprises several distinct storage cells adapted to accommodate a flat tray 25, one of which is shown in a partially extended condition in FIG. 1. An access opening 26 in cabinet 10 permits a selected tray 25 to be withdrawn therethrough from its respective carrier cell under conditions where motor 21 has been deenergized at the appropriate relative chain position. At the heart of the present invention an extractor mechanism 27 is provided to engage the selected tray 25 and withdraw it from cabinet 10 for access to the contents thereof on the surface of a table 28 extending in cantilever fashion from the front wall 30 of cabinet 10.

More specifically, extractor mechanism 27 comprises a tray engaging arm 31 (see FIG. 2) and a guided member 32 mounted to be driven in concert along guide track 33 extending outwardly along table 28. A pair of sprocket wheels 34, 35 also mounted on table 28 advance a sprocket chain 36 to any one of several predetermined positions of pin 37. These positions of pin 37 along the path traversed by chain 36 determine the functional relationship of arm 31 and tray 25, e.g., in the position illustrated by FIG. 2 the arm is engaging tray 25 while it is at rest in its carrier cell within the confines of cabinet wall 30. The importance of this particular functional relationship will become more apparent in the description of the several operative conditions set forth below.

Tray engaging arm 31 is mounted on guided member 32 by a pair of nuts secured to bolts 38, 40 extending through a first slot 41 in arm 31 and making engagement therewith by means of bearing sleeves 42 (one of which is shown in section in FIG. 3). A flange portion 43 of member 32 extends under guide track 33 for sliding engagement therewith as shown in FIG. 4. Cooperating track elements 44, 45 and strip 46 are provided with appropriate surface coating to render engagement therewith substantially frictionless. Pin 37 extends through a second slot 48 in arm 31 and it also extends through a transverse slot 50 in guided member 32, which transverse slot is in registration with second slot 48. Pin 37 is provided with a bearing sleeve 51 (FIGS. 3 & 4) for providing slidable engagement with the edge portions of slot 48. The lower end of pin 37 is secured for pivotal engagement to chain 36 by means of collar 52 and flat head portion 53 at the lower most extremity of pin 37.

"In" limit switch 55 and "out" limit switch 56 are shown in FIG. 2. Their engagement with cooperating cams 57 (shown in phantom in FIG. 2) and 58 (see FIGS. 6–8) determines the limits of travel of chain 36, as discussed below with respect to operative conditions illustrated by FIG. 3 and FIGS. 6–8. FIG. 5 shows cam 57 (shown in phantom outline in FIG. 2 for descriptive purposes) engaging limit switch 55. The cam is secured to the chain by means of extension 57 of chain roller 60 and slides along the frictionless surface of element 44 by means of pin 61 secured to cam 57 by rivot 62. The limit switch, mounted on base 63, includes an actuating arm 64 pivoted at tabs 65, 66 under conditions where roller 67 engages cam 57.

Sprocket wheel 34 is driven by motor 68 via shaft 71 and coupling mechanism 70. Motor 68 is mounted to frame member 74 by means of appropriate mounting bracket 75 and studs 76, 77. The control circuit of motor 68 is energized in accordance with the conditions of limit switches 55 and 56.

Outermost sprocket wheel 35 (see FIG. 3) is horizontally adjustable to eliminate slack in chain 36 that may arise from time to time due to wear. Wheel 35, mounted on plate 72, having flange 73 extending therefrom, is adapted to be positioned along an outwardly extending axis by tightening bolt 78, which effectively tightens chain 38 by repositioning the axis of wheel 35 from left to right (FIG. 3). Screws 80, 81, secured to plate 72 through slots in member 74 retain the elements rigidly in the adjusted position.

In operation, the extractor mechanism described above has four basic conditions of operation. The first condition is referred to as an "at rest" position as shown in FIG. 8, where the conveyor may be operative during the selection and positioning of a particular tray for access at opening 26 (FIG. 1). When a selected tray is positioned at the opening, tray engaging arm 31 is coupled to the tray 25 by extending a pick up finger 82 through a rectangular aperture 83 (see FIG. 3) in tray 25 and engaging the front face 84 of tray 25. The relative height of aperture 83 with respect to the thickness of finger 82 permits desirable posting position tolerances. This is the second condition and is illustrated by FIG. 2.

The third condition is the transporting function of the device and is illustrated by FIG. 6. When the tray is being withdrawn, finger 82 bears against the inner surface of face 84, while under conditions where the tray is being returned to the cabinet the arm is bearing against the outer surface of the tray. An extension 85 on guided member 32 serves as back-up means during the return of a tray, e.g., if the arm slips slightly from engagement with the tray due to an askew tray condition, extension 85 will engage the tray face and urge it inwardly notwithstanding poor engagement between arm 31 and tray 25. The last of the four basic conditions is illustrated at FIG. 7. The tray 25 has been completely removed from the cabinet and articles therein are readily accessible on the surface of table 28.

In the four conditions described above pin 37 determines the transverse position of tray engaging arm 31 with respect to member 32, i.e., in the first condition (FIG. 8), arm 31 is retracted, whereas in all other three conditions arm 31 is extended. It should be noted that in the second condition (FIG. 2) pin 37 has been moved approximately 90° clockwise around wheel 34. This permits arm 31 to engage tray 25 under the urging of the arm toward the tray by means of a spring 86 (see FIGS. 2, 4) disposed between tab 87 on member 32 and extension 88 of arm 31. It should be emphasized that arm 31 is urged inwardly toward tray 25 during this rotation of pin 37, whereby finger 82 is automatically inserted into aperture 83. During transport (condition three) the arm is held in the engaged position by virtue of pin 37, which has been sequentially rotated clockwise 90° further around wheel 34 and thence outwardly along the chain path toward wheel 35 and tangentially thereto. The pin retains arm 31 against tray 25 by virtue of its bearing against the end of slot 48 as shown in FIG. 6. In the fourth and last condition pin 37 has come to rest at the outermost point of wheel 35 along chain 36 at which point cam 58 engages switch 56 and the system comes to rest to permit access to the extracted tray (FIG. 7). In this position the tray may be disengaged from arm 31 by manually urging it against the bias of spring 86. Of course, when return of the tray is desired, the chain, pin and sprocket array is driven in the opposite direction until switch 55 engages cam 57. Arm 31 is pulled automatically away from tray 25 and out of cabinet 10 (FIG. 8).

Although a specific embodiment of the invention has been illustrated and described in detail by way of example, it is to be understood that the invention is not limited thereto. Various changes may be made in the design and arrangement of parts without departing from the spirit and scope of the invention, as will be readily understood by those skilled in the art.

I claim:

1. An article storage apparatus comprising: A cabinet with an acess opening therein, a work table projecting horizontally from and beneath said opening, continuous conveyor means, mean for mounting said conveyor means within said cabinet, a plurality of trays, said conveyor means including means for supporting said trays thereon, means for controlling said conveyor means to selectively position a selected tray at said opening, an extractor mechanism for withdrawing a selected tray from said cabinet through said opening onto said work table and thereafter returning the same into said cabinet, guide means secured to the work table extending horizontally therealong normal to the cabinet opening, a guided member having a slot extending parallel to the cabinet opening mounted for reciprocal motion along the guide means, a tray latching member having a slot in registration with the slot of the guided member and connected to the guided member so as to be slideable relative thereto along the direction of the slots, drive means affixed to the table having an element engaging the slots of the guided member and tray latching member for reciprocally driving said members, along a reciprocal path defined by the guide means, from a rest position at which said members are adjacent the end of the reciprocal path proximate the cabinet and the slot engaging element is displaced from an end of the slots proximate the selected tray, and coupling means connected between the guided member and tray latching member for forcing the tray latching member to slide relative to the guided member into engagement with the selected tray as the drive means moves said members to the end of the reciprocal path adjacent the cabinet and thereafter moves said members in the opposite direction along the reciprocal path to withdraw the tray from the cabinet.

2. The apparatus of claim 1 wherein the drive means comprises a chain and sprocket wheel assembly having a pin forming the slot engaging element affixed to the chain, one sprocket wheel being located adjacent the cabinet and the other sprocket wheel located at the end of the table remote from the cabinet whereby the pin moves along a curved path at each end of the reciprocal drive path, and the rest position of the pin along the curved path of said one sprocket wheel being at a point further from the selected tray than the point at which a tangent to the curved path is parallel to the cabinet opening thereby precluding the coupling means from forcing the tray latching member into engagement with the selected tray until the drive means is actuated to move the pin to the point of tangency whereat the coupling means acts to force the tray latching member into engagement with the tray.

3. The apparatus of claim 2 wherein the slots in the guided member and tray latching member are so constructed and arranged that the pin impinges against the tray latching member slot end proximate the tray to hold the latching member in engagement with the selected tray as said members move back and forth along the reciprocal drive path.

4. The apparatus of claim 3 wherein the chain and sprocket wheel assembly is horizontally disposed and laterally displaced to the side of the tray at the cabinet opening so that engagement and disengagement of the tray latching member with the selected tray is accomplished by sideways sliding motion of the tray latching member relative to the guided member.

5. The apparatus of claim 4 wherein the stop position of the pin, upon full tray withdrawal from the cabinet, corresponds to the point which is furthest from the cabinet along the curved path around the sprocket wheel remote from the cabinet and at which point the pin is out of contact with the end of the slots proximate the tray thereby enabling the tray latching member to be moved manually sideways out of engagement with the tray.

6. The apparatus of claim 5 further including limit switch means for deactivating the reciprocal drive means when the pin reaches the rest position and full withdrawal stop position.

* * * * *